(12) United States Patent
Ricker et al.

(10) Patent No.: US 10,802,914 B2
(45) Date of Patent: Oct. 13, 2020

(54) METHOD OF USING COMMON STORAGE OF PARITY DATA FOR UNIQUE COPY RECORDING

(71) Applicant: Cisco Technology, Inc., San Jose, CA (US)

(72) Inventors: Clint Ricker, Lawrenceville, GA (US); Ryan Michael Okelberry, Provo, UT (US); Dana Marlow Henriksen, Lindon, UT (US); Mel J. Oyler, Pleasant Grove, UT (US); Hoi-Tauw Jozef Chou, Dublin, CA (US); Kevin Wayne Kingdon, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 16/042,409

(22) Filed: Jul. 23, 2018

(65) Prior Publication Data
US 2020/0026601 A1 Jan. 23, 2020

(51) Int. Cl.
*G06F 11/00* (2006.01)
*G06F 11/10* (2006.01)
*G06F 11/07* (2006.01)
*G06F 3/06* (2006.01)

(52) U.S. Cl.
CPC .......... *G06F 11/1076* (2013.01); *G06F 3/065* (2013.01); *G06F 3/067* (2013.01); *G06F 3/0619* (2013.01); *G06F 11/0727* (2013.01); *G06F 2211/1014* (2013.01)

(58) Field of Classification Search
CPC .. G06F 11/1076; G06F 11/0727; G06F 11/10; G06F 11/1004; G06F 11/1032; G06F 3/0619; G06F 3/065; G06F 3/067; G06F 2211/1014
See application file for complete search history.

(56) References Cited

U.S. PATENT DOCUMENTS

| | | | |
|---|---|---|---|
| 7,827,439 B2 | 11/2010 | Mathew et al. | |
| 8,307,017 B1* | 11/2012 | Morris | G06F 21/6227 707/812 |
| 9,122,629 B2 | 9/2015 | Mridha et al. | |
| 9,424,178 B2 | 8/2016 | Sharon et al. | |
| 2008/0133967 A1* | 6/2008 | Lee | G06F 11/2082 714/6.12 |
| 2017/0147265 A1* | 5/2017 | Kingdon | G06F 11/108 |
| 2017/0249242 A1 | 8/2017 | Thatcher et al. | |
| 2017/0315869 A1 | 11/2017 | Rungta et al. | |

* cited by examiner

*Primary Examiner* — Joseph D Manoskey
(74) *Attorney, Agent, or Firm* — Merchant & Gould P.C.

(57) ABSTRACT

A disclosed method is performed at a fault-tolerant object-based storage system including M data storage entities, each is configured to store data on an object-basis. The method includes obtaining a request to store N copies of a data object and in response, storing the N copies of the data object across the M data storage entities, where the N copies are distributed across the M data storage entities. The method additionally includes generating a first parity object for a first subset of M copies of the N copies of the data object, where the first parity object is stored on a first parity storage entity separate from the M data storage entities. The method also includes generating a manifest linking the first parity object with one or more other subsets of M copies of the N copies of the data object.

16 Claims, 8 Drawing Sheets

METHOD OF USING COMMON STORAGE OF PARITY DATA FOR UNIQUE COPY RECORDING

TECHNICAL FIELD

The present disclosure relates generally to storage systems, and in particular, to enabling more efficient storage of parity data for data recovery.

BACKGROUND

On behalf of customers, cable or other media delivery service providers typically use largescale unique copy cloud digital video recorder (DVR) storage in order to record programs. Unlike other large scale storage systems, most of the content in unique copy cloud DVR deployments consists of identical objects. These identical objects are stored hundreds, if not thousands of times, as repeated instances of the same content.

The Digital Millennium Copyright Act (DMCA), enacted in the United States of America on Oct. 28, 1998, provides that one and only one unique instance of the media data may be created for each customer. In order to comply with copyright and the associated fair use restrictions, the cloud DVR file systems would store multiple copies of the same video data, e.g., one for each person recording the video. These copies are often stored in a fault tolerant manner with the associated parity data. Using parity data, the original data can be recovered in the event of disk or hardware failure.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Enterprise data storage can benefit from techniques that enable writing large volumes of data across a set of one or more computing devices (e.g., storage entities) in a fault-tolerant manner. In the context of recording media programs, such as television programs and movies, multimedia content often includes hundreds, if not thousands, of sets of identical objects. In the fault-tolerant system, a sizable amount of identical parity data is also stored. Although the parity data provides resiliency and redundancy to the data object being stored, storing the parity data is a significant overhead to disk storage. Particularly in an uncompressed cloud DVR environment, a sizable amount of parity data is also generated and stored, e.g., hundreds, if not thousands of times, as repeated (e.g., identical) instances of the same parity data. This drives up the cost of the overall storage and increases the amount of computation resources for generating and writing the duplicate content. In light of these considerations, and in accordance with various implementations, a method is disclosed for efficient parity data generation and storage. In some implementations, the method includes generating and storing compressed parity data for identical content instances. The method in accordance with the embodiments described herein thus reduces the disk overhead and increases the amount of multimedia data objects storable in the file system.

Various implementations disclosed herein include systems, devices, and methods for generating and storing parity data that correspond to multiple copies of a multimedia data object. For example, in some implementations, a method is performed at a fault-tolerant object-based storage system including M data storage entities and one or more controllers, where each of the M data storage entities is configured to store data on an object-basis. The method includes obtaining a request to store N copies of a data object within the fault-tolerant object storage system. The method further includes storing the N copies of the data object across the M data storage entities in response to the request, where the N copies of the data object are distributed across the M data storage entities, such that any two sequential copies of the N copies are stored on two separate storage entities of the M data storage entities. The method also includes generating a first parity object for a first subset of M copies of the N copies of the data object, where the first parity object is stored on a first parity storage entity separate from the M data storage entities. The method additionally includes generating a manifest linking the first parity object with one or more other subsets of M copies of the N copies of the data object.

Example Embodiments

Figure 1A:
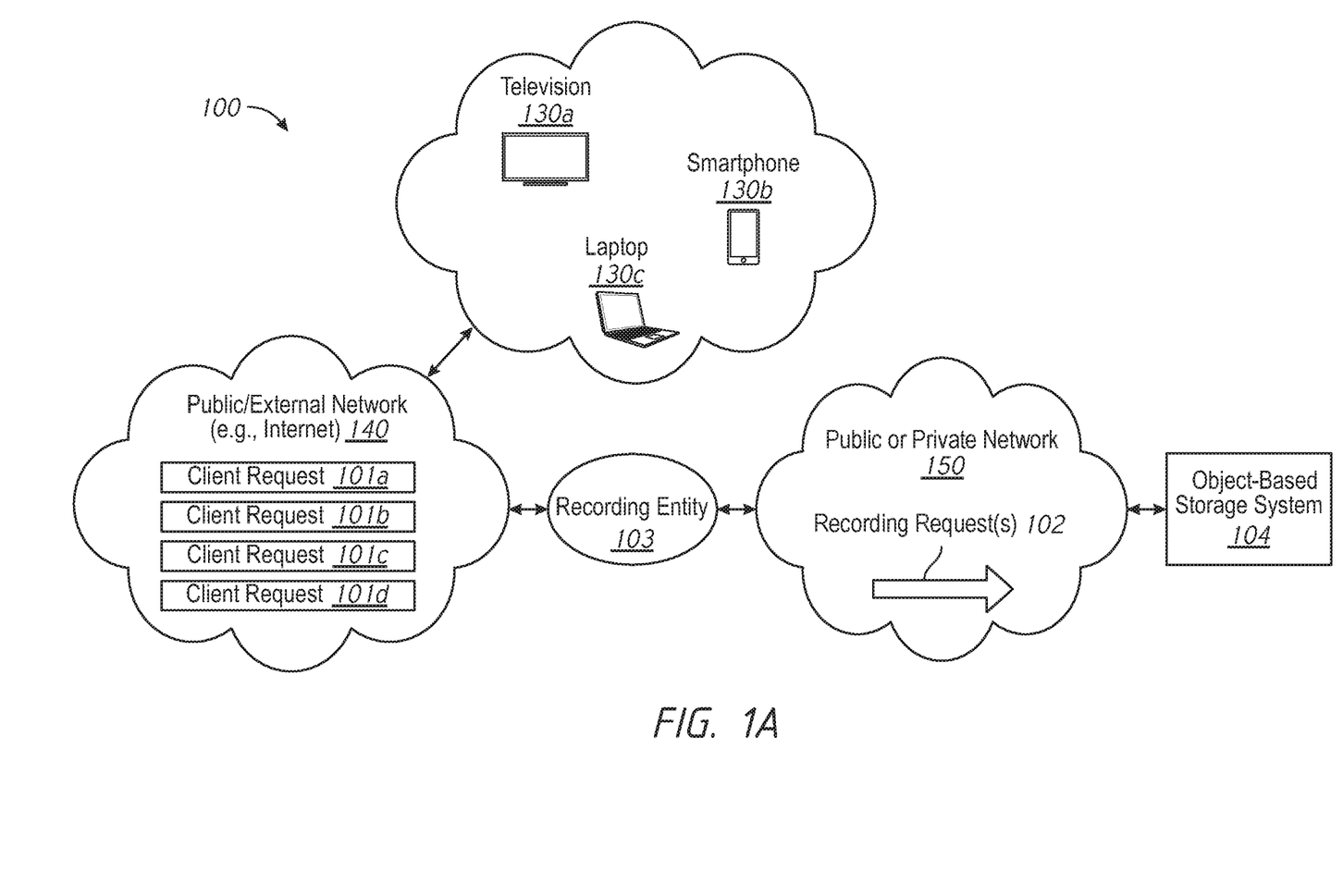
FIG. 1A is a block diagram representation of a storage environment in accordance with some implementations.
Figure 1B:
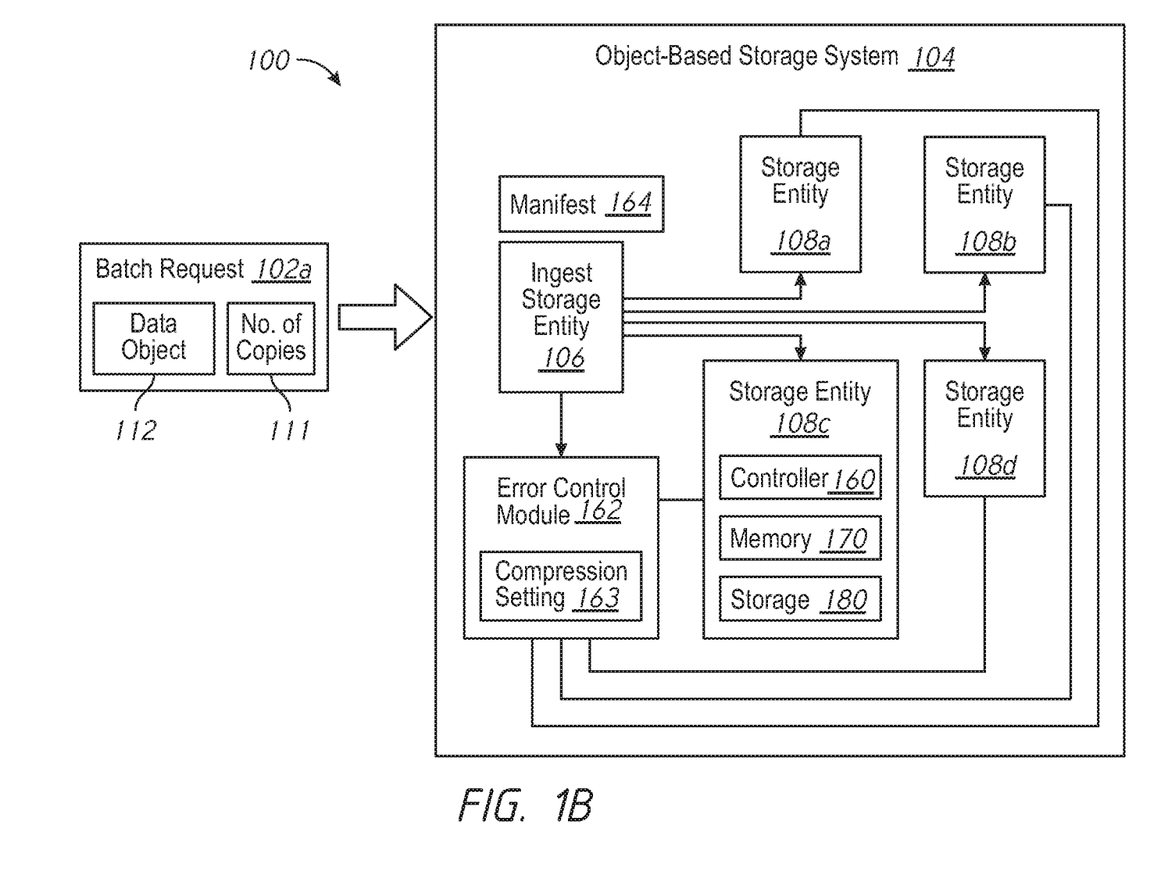
FIG. 1B is a block diagram representation of a storage environment in accordance with some implementations.

FIGS. 1A and 1B are block diagram representations of a storage environment 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, in some implementations, the storage environment 100 includes client devices 130, such as a television 130a, a smartphone 130b, and/or a laptop 130c. Other types of client devices 130 not shown include set-top boxes, video game consoles, tablets, computers, and any other electronic devices configured to obtain and convey audiovisual media information. FIG. 1A illustrates that one or more client devices 130 are connected to a public or external network 140 (e.g., the Internet). In some implementations, a respective client device 130 is connected to the public or external network 140 in order to transmit one or more read/write requests 101, e.g., client requests 101a, 101b, 101c and 101d, to a recording entity 103 and/or to an object-based storage system 104.

In some implementations, the storage environment 100 is configured to store audio/visual data associated with multicast (e.g., broadcast) content and acts as a digital video recorder (DVR). As both data and read/write requests can be received over a network, the storage environment 100 can function as a cloud-based DVR. To that end, in some implementations, a respective client request, such as the client request 101, includes information identifying a portion of a media item, such as a video or an episode of a TV show. In some implementations, the client device 130 transmits several client requests 101 in succession in order to enable storage of a portion of a media item. For example, one client request corresponds to two seconds of data for a news program that the client device 130a requests to be recorded. In order to record half an hour worth of the news program, the client device 130a would send nine hundred successive client requests 101 through the public network 140 to the recording entity 103.

FIG. 1A also illustrates that, in some implementations, the storage environment 100 includes the recording entity 103 connected by a public or private network 150 to the object-based storage system 104. In some implementations, the recording entity 103 receives one or more client requests 101 and generates one or more recording requests 102. For example, in a media storage environment, a client device, such as the laptop 130c, sends one client request 101a to the recording entity 103 in order to record a portion of a particular media item. In some implementations, the recording entity 103 is managed or operated by an entity that provides multimedia content to end users, such as a cable television provider, an online-streaming platform, and/or a satellite programming provider.

In some implementations, the recording entity 103 aggregates the one or more client requests 101 into the one or more recording requests 102. In some implementations, the one or more recording requests 102 include a batch request. For example, the recording entity 103 may receive one hundred client requests 101 within a predefined batching time period from one hundred distinct client devices 130. The one hundred client requests 101 may be associated with the same two seconds of a particular media item. In response to the one hundred client requests 101, the recording entity 103 translates those client requests 101 into a single batch request 102 for storage at the object-based storage system 104. In such implementations, there is a many-to-one relationship between the client requests 101 and the batch request 102. As such, many client requests 101 are aggregated or packaged into the single batch request 102. In some other implementations, there is a one-to-one relationship between the client requests 101 and the batch requests 102. For instance, if one received client request 101 corresponds to recording a particular media item within the predefined batching time period, the recording entity 103 creates the batch request 102 that corresponds to the single client request 101.

In some implementations, the storage environment 100 does not include the recording entity 103 as a separate component. For instance, the recording entity 103 can be part of the object-based storage system 104. In such implementations, the client requests are received by the object-based storage system 104 and the one or more client requests 101 are passed to the object-based storage system 104 through the public or private network 150.

FIG. 1B illustrates a portion of the storage environment 100 in accordance with some implementations. In some implementations, the portion of the storage environment 100 as shown in FIG. 1B is the object-based storage system 104 (FIG. 1A) that receives a batch request 102a corresponding to one or more client requests 101 (FIG. 1A). In some implementations, the object-based storage system 104 is configured to primarily store data in one or more storage entities (e.g., storage entities 108 and/or ingest storage entity 106) on an object-basis, rather than, for example, a file-basis. The object-based storage system 104 (also known as the object storage system) described herein stores and manages data as objects, where each object includes a globally unique identifier, the content data, and/or metadata corresponding to the content data. In contrast, file-based storage systems often manage data storage through the use of hierarchy, a globally unique path for a respective file, and a naming convention that does not require a unique name for each file.

In some implementations, the object-based storage system 104 receives stand-alone client requests, or client requests packaged as batch request(s) 102a, as described above with respect to FIG. 1A. In some implementations, the batch request 102a includes information such as a copy count 111 along with a data object 112. The copy count 111 specifies the number of copies of the data object 112 for storage within the object-based storage system 104. For example, the data object 112 can include data corresponding to a particular video of a basketball game, and the copy count 111 indicates that in response to requests from five hundred client devices, five hundred copies of the data object 112 are to be stored in the storage space of the object-based storage system 104.

Still referring to FIG. 1B, in some implementations, the object-based storage system 104 includes one or more storage entities, such as servers, disks, and other computing devices. These components work together in order to store information corresponding to a recording request (e.g., the recording request 102 as shown in FIG. 1A) received by the object-based storage system 104. In some implementations, a respective storage entity (e.g., a storage entity 108a) of the object-based storage system 104 stores data and/or parity data. In some implementations, any storage entity (e.g., the storage entity 108a, 108b, 108c, or 108d) can be defined as an ingest storage entity 106. When a storage entity is designated as the ingest storage entity 106, other storage entities, such as the storage entities 108a, 108b, 108c, and 108d, are referred to as peer storage entities with respect to the ingest storage entity 106. FIG. 1B illustrates that one or more storage entities (e.g., the storage entity 108c) include components, such as a controller 160, an error control module 162, memory 170 (e.g., RAM), and storage space 180 (e.g., non-volatile memory). In some implementations, each of the storage entities is a server or a stripe in the fault-tolerant object-based storage system 104. Collectively, the storage entities (e.g., the storage entities 108 and the ingest storage entity 106) in the object-based storage system 104 are a cluster of servers in accordance with some implementations.

In some implementations, the controller 160 for a respective storage entity has control links to every other storage entity of the object-based storage system 104. In some implementations, the error control module 162 generates or directs the generation of fault tolerant data in the storage entity 180. In some implementations, the error control module 162 resides within the controller 160 (not shown); while in some other implementations, the error control module 162 is an entity distinct (e.g., separate) from the controller 160 as shown in FIG. 1B.

While the storage entity 108c is shown to include components such as the controller 160, memory 170, and storage 180, it will be understood by one of ordinary skill in the art that any storage entity of the object-based storage system 104 can have one or more of these components or other components not shown. Further, the components can be combined, integrated, or separated. For example, in some implementations, the error control module 162 includes memory for storing a compression setting 163. As will be described below in detail with reference to FIGS. 2A-2C, in some implementations, the parity compression indicator stored in the compression setting 163 is user configurable.

When the compression setting 163 indicates that the parity compression is turned on, the error control module 162 directs the generation of compressed parity objects in order to save space for storing the data objects, as will be described below with reference to FIGS. 2B and 2C. In comparison, when the compression setting 163 indicates that the parity compression is turned off, the error control module 162 does not direct compression of the parity object, and duplicate parity objects may be generated for duplicate data objects, as will be described in detail below with reference to FIG. 2A.

It should be noted that when the parity compression indicator is on, there is no one-to-one relationship between the parity and the recorded data object. Because the parity object itself is not the original multimedia data, the compression of the parity objects for duplicate data objects would not yield information that identical copies of the recorded data object exist. Accordingly, turning on the compression setting 163 would not violate copyright and the associated fair use restrictions in the United States. Legal requirements are different around the world. Providing a user configurable compression setting 163 would allow the customer to decide whether to turn on or off the parity object compression in order to comply with local requirements.

As an interface of the object-based storage system 104, in some implementations, the ingest storage entity 106 of the object-based storage system 104 receives and/or transmits data, an instruction, or any type of communication from outside the object-based storage system 104, e.g., the batch request 102a. As explained above, any storage entity (e.g., the storage entity 108a, 108b, 108c, or 108d) can be defined as the ingest storage entity 106. In other words, in some implementations, a respective storage entity, designated as an ingest storage entity 106 for a respective recording request, is not designated as the ingest storage entity 106 for all received batch requests. For example, one storage entity identified as Server B of the object-based storage system 104 receives a first batch request to record an episode of a cooking show. In this example, Server B serves as the ingest storage entity 106 with respect to the first batch request. Subsequently a different storage entity, which is identified as Server G of the object-based storage system 104, is designated as an ingest storage entity for a subsequent batch request.

In some implementations, the ingest storage entity 106 also receives and/or transmits various communications within the object-based storage system 104, such as communicating write requests containing write operations to storage entities 108a, 108b, 108c, and/or 108d. In particular, in some implementations, the object-based storage system 104 reduces the risk of losing the stored data object 112 by distributing copies of the data object 112 among various storage entities 108. In some implementations, the object-based storage system 104 is configured to use distributed erasure coding (DEC) in order to store information for fault-tolerance purpose. In some implementations, the parity data generated according to DEC are also distributes across multiple storage entities 108.

For example, the object-based storage system 104 is configured with a particular data-to-parity storage ratio (also known as the DEC pattern). The data-to-parity storage ratio indicates how many storage entities will store content data (e.g., copies of the data object 112) corresponding to a respective batch request 102a, and how many storage entities will store the parity information corresponding to the respective batch request 102a. In case the data-to-parity storage ratio is 3:2, for example, the object-based storage system 104 includes three storage entities for storing content data and two storage entities for storing the corresponding parity data. In such implementations, the ingest storage entity 106 converts one recording request to multiple write operations and communicates the multiple write requests to other storage entities. In the above example of a 3:2 DEC pattern storage system, the ingest storage entity 106 converts one batch request 102a to five write operations in total, e.g., three write operations for writing data objects and two write operations for writing parity objects.

In another example, the batch request 102a can correspond to storage of four hundred copies of the data object 112 (e.g., a popular talk show). In FIG. 1B, the fault-tolerant object-based storage system 104 can be configured to store and distribute data as well as the corresponding parity data for the batch request 102*a* across four data-storing storage entities 108*a*, 108*b*, 108*c*, and 108*d* and two parity-storing storage entities (not shown), e.g., a DEC pattern of 4:2. Upon receiving the batch request 102*a*, one hundred copies of the data object 112 are stored at the storage entity 108*a* of object-based storage system 104, one hundred copies are stored at the storage entity 108*b*, one hundred copies are stored at the storage entity 108*c*, and one hundred copies are stored at the storage entity 108*d*. Further, a first parity data corresponding to the data object 112 can be stored at a first storage entity (not shown) of the object-based storage system 104, and a second parity data corresponding to the data object 112 can be also stored at a second storage entity (not shown) of the object-based storage system 104.

In some implementations, the ingest storage entity 106 selects a set of storage entities, e.g., the storage entities 108*a*, 108*b*, 108*c*, and 108*d*, to receive the write requests corresponding to the received request 102*a*. While in some other implementations, instead of making the selection at the ingest storage entity 106, another entity within the object-based storage system 104 performs the selection of the storage entities 108*a*, 108*b*, 108*c*, and 108*d*. The set of storage entities corresponds to the data-to-parity storage ratio represented by M:N, so that the subset including M data-storing storage entities is assigned to store data associated with the request 102*a* and the subset including N parity-storing storage entities is assigned to store parity data associated with the request 102*a*. In some implementations, the ingest storage entity 106 is among the M data-storing or N parity-storing storage entities for a respective batch request 102*a*. In other words, the ingest storage entity 106 is one of the storage entities 108, and is designated as the ingest storage entity 106 for receiving the request 102*a* and generating write requests as well as storing data and/or parity objects.

In some implementations, the ingest storage entity 106 generates write requests for transmission to each of the determined set of storage entities and offloads the processing burden to the selected storage entities for completing the writing requests. In some implementations, the ingest storage entity 106 does not generate the number of copies specified by the copy count 111 by itself. This frees up the bandwidth by avoiding transmission of duplicate copies of the data object 112 between the ingest storage entity 106 and the storage entities, such as the storage entities 108*a*, 108*b*, 108*c*, and 108*d*, and reduces memory and CPU usage at the ingest storage entity 106. In such implementations, each write request includes information such as the data object 112, a location for retrieving data object 112, the copy count 111, the storage entity number of the receiving storage entity (e.g., 3rd data storage entity of 5), the data-to-parity storage ratio, and/or whether the receiving storage entity is a parity-storing or data-storing storage entity for this particular write request etc. Upon receiving the write requests, each storage entity 108 pulls one copy of the data object 112 from memory of the ingest storage entity 106, and proceeds to make the appropriate number of copies on a corresponding disk.

For example, the storage entity 108*a* of object-based storage system 104 receives a write request from the ingest storage entity 106. The write request identifies where to retrieve the data object 112 from the memory of ingest storage entity 106. The write request further identifies 299 additional copies of the data object 112 will be stored within the object-based storage system 104 based on the copy count 111. Additionally, the write require specifies that the storage entity 108*a* is a data-storing storage entity, where the data-to-parity storage ratio is 3:2, and the storage entity 108*a* is the third data-storing storage entity receiving the write request. According to such write request, 100 copies (1 original object plus 99 copies) of data object 112 will be stored at the first data-storing storage entity of the set, 100 copies will be stored at the second data-storing storage entity, and 100 copies will be stored at the third data-storing storage entity, namely, the storage entity 108*a*. Upon receiving the write request, the storage entity 108*a* pulls one copy of the data object 112 from memory of the ingest storage entity 106 and determines 100 copies of the data object 112 to write within its storage space.

In some implementations, the locations of the data objects and parity objects in the object-based storage system 104 are maintained by manifest 164. The manifest data 164 in accordance with some implementations provides information for media content rendering and recovery. During media content rendering, using the manifest data 164, the data objects distributed on the storage entities 106 and 108 can be pieced together prior to being provided to the client devices 130 (FIG. 1A). During media content recovery, the manifest data 164 provides information related to identifying the association (or linking) of the parity objects with the data objects. As such, during fault recovery, the corresponding parity objects can be located to restore a missing data object.

Though FIG. 1B illustrates the manifest data 164 as one entity separately from other components of the object-based storage system 104, the manifest data 164 can be stored within any of the components of the object-based storage system 104 and can be distributed over multiple components of the object-based storage system 104. For example, the manifest data 164 identifying the association between the data objects and the parity objects can be stored within the error control module 162 and accessible by the storage entities 108, as will be described in detail below with reference to FIG. 3.

While FIG. 1B illustrates five storage entities 106, 108*a*, 108*b*, 108*c*, and 108*d* in the object-based storage system 104, those of ordinary skill in the art will appreciate from the present disclosure that various other combinations of storage entities, servers and/or computing devices in the object-based storage system 104 can be implemented and have not been illustrated for the sake of brevity. Each of the depicted example storage entities 106, 108*a*, 108*b*, 108*c*, and 108*d* of the object-based storage system 104 can be implemented on the same or separate computing devices. In some implementations, the object-based storage system 104 can be a geographically-distributed storage system, including multiple computing devices networked over multiple locations.

Figure 2A:
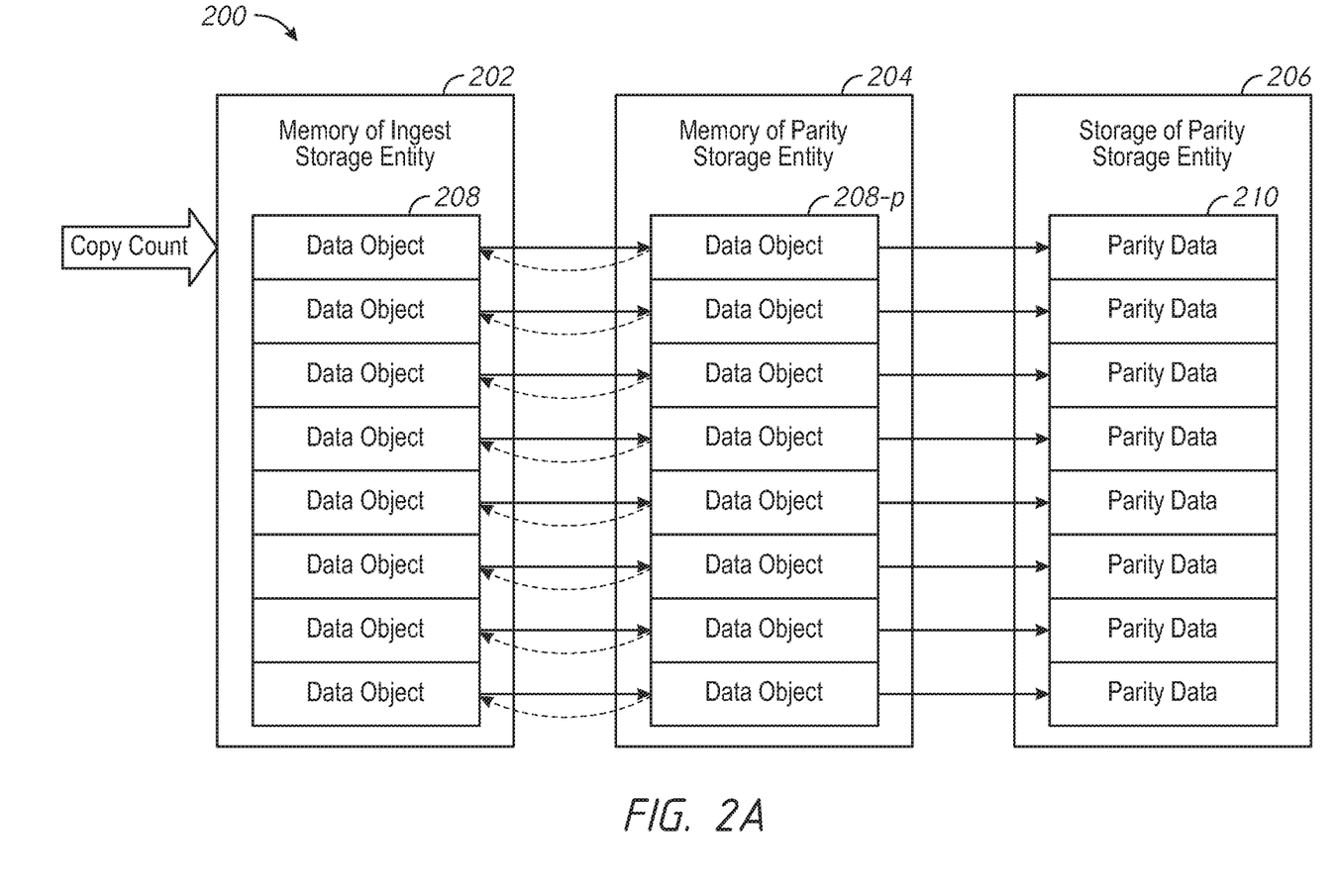
FIG. 2A is a block diagram representation of a storage environment demonstrating a first approach to storing multiple copies of parity data corresponding to a data object in accordance with some implementations.

FIG. 2A is a block diagram of a storage environment 200 demonstrating a first approach to storing multiple copies of parity data corresponding to a data object, in accordance with some implementations. In some implementations, this approach is used when the parity compression indicator stored in the compression setting 163 (FIG. 1B) indicates that the parity compression is turned off. As such, parity objects are generated and stored for duplicate data objects.

In the approach shown in FIG. 2A, an ingest storage entity with memory 202 receives a recording request to store multiple copies of a respective data object 208 and to back up each of the multiple copies using parity data. The ingest storage entity generates the number of copies of the data object 208 as indicated by the copy count, e.g., in the memory 202. After writing copies of the data object 208 to the memory 202, the ingest storage entity sends the storage data and instructions corresponding to each of the data object 208 to one or more parity-storing storage entities. A parity-storing storage entity, with memory 204 (e.g., RAM) and persistent storage 206 (e.g., non-volatile memory), receives the storage data and instructions, and stores each incoming data object 208 in the memory 204 as respective data object 208-*p*. The parity-storing storage entity optionally sends a feedback message to the ingest storage entity after each data object has been stored in the memory 204.

The storage technique illustrated in FIG. 2A is inefficient and wasteful of computational resources. For example, if 1000 copies of data object 208 and 500 copies of parity data object 208 are requested to be stored in the storage environment 200, the communication path between the ingest storage entity and one or more storage entities transports 1500 copies of object, 1500 write instructions, and 1500 acknowledgment messages. FIG. 2A illustrates that the parity-storing storage entity translates the data object 208-*p* in the memory 204 into corresponding parity data values 210 and moves them to the persistent storage 206 by performing a one-to-one translation and copying.

Figure 2B:
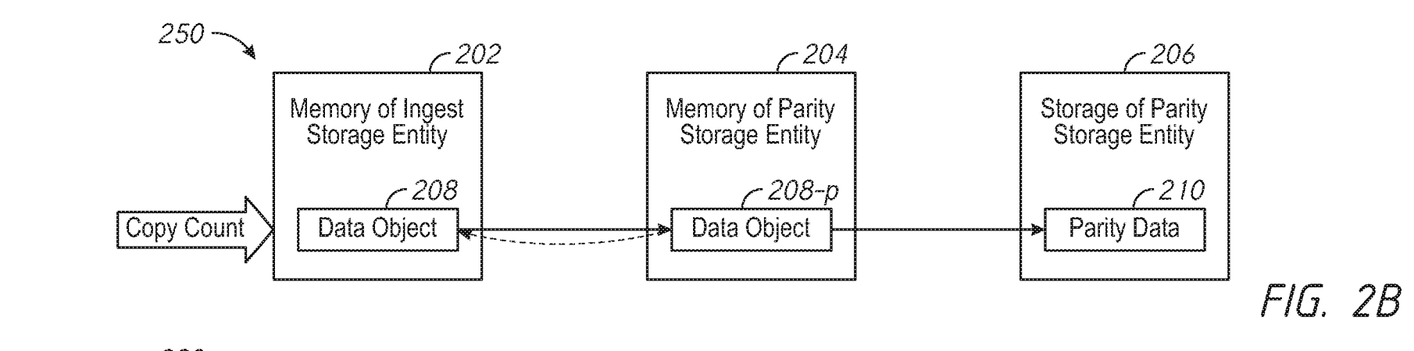
FIG. 2B is a block diagram representation of a storage environment demonstrating a second approach to storing parity data corresponding to a data object in accordance with some implementations.

FIG. 2B is a block diagram of a storage environment 250 demonstrating a second approach to storing parity data corresponding to a data object 208 in accordance with some implementations. In some implementations, this approach is used when the parity compression indicator stored in the compression setting 163 (FIG. 1B) is turned on. As such, compressed parity objects are generated and stored for duplicate data objects in order to save space and bandwidth for data object storage. Thus, the storage environment 250 shown in FIG. 2B is an improvement over the storage environment 200 shown in FIG. 2A. Elements common to FIGS. 2A and 2B include common reference numbers, and the differences between FIGS. 2A and 2B are described herein for the sake of brevity.

To that end, the storage environment 250 includes memory of ingest storage entity 202, memory of parity storage entity 204, and storage of parity storage entity 206. In contrast to the approach shown in FIG. 2A, a single copy of the data object 208 is stored in the memory 202 of the ingest storage entity. In some implementations, the ingest storage entity sends a write instruction to one or more parity-storing storage entities in order to translate the data object 208 into corresponding parity data and in order to make a particular number of copies of the parity data object. In some implementations, the ingest storage entity pushes data object 208 to the parity-storing storage entity, while in some other implementations the ingest storage entity instructs the parity-storing storage entity to retrieve the data object 208 from the memory 202. In some implementations, after the parity-storing storage entity obtains the data object 208 from the memory 202 of the ingest storage entity, the parity-storage entity stores the data object 208 in the memory 204 as data object 208-*p*. In some implementations, the parity-storing storage entity sends a communication back to the ingest storage entity in order to indicate that the parity-storage entity has stored the data object 208-*p* in the parity storage entity memory 204.

Relative to the first approach described above with reference to FIG. 2A, the second approach illustrated in FIG. 2B saves both storage space and communication bandwidth. For example, if 1000 copies of data object 208 and parity data object 208 are requested to be stored in the storage environment 250, the communication path between the ingest storage entity and one or more storage entities transports one copy of object, one write instruction, and possibly one acknowledgment message. Thus, relative to the first approach shown in FIG. 2A, the second approach as shown in FIG. 2B reduces the disk overhead and computational resources for writing objects, so that more concurrent data objects 208 can be processed and stored.

Figure 2C:
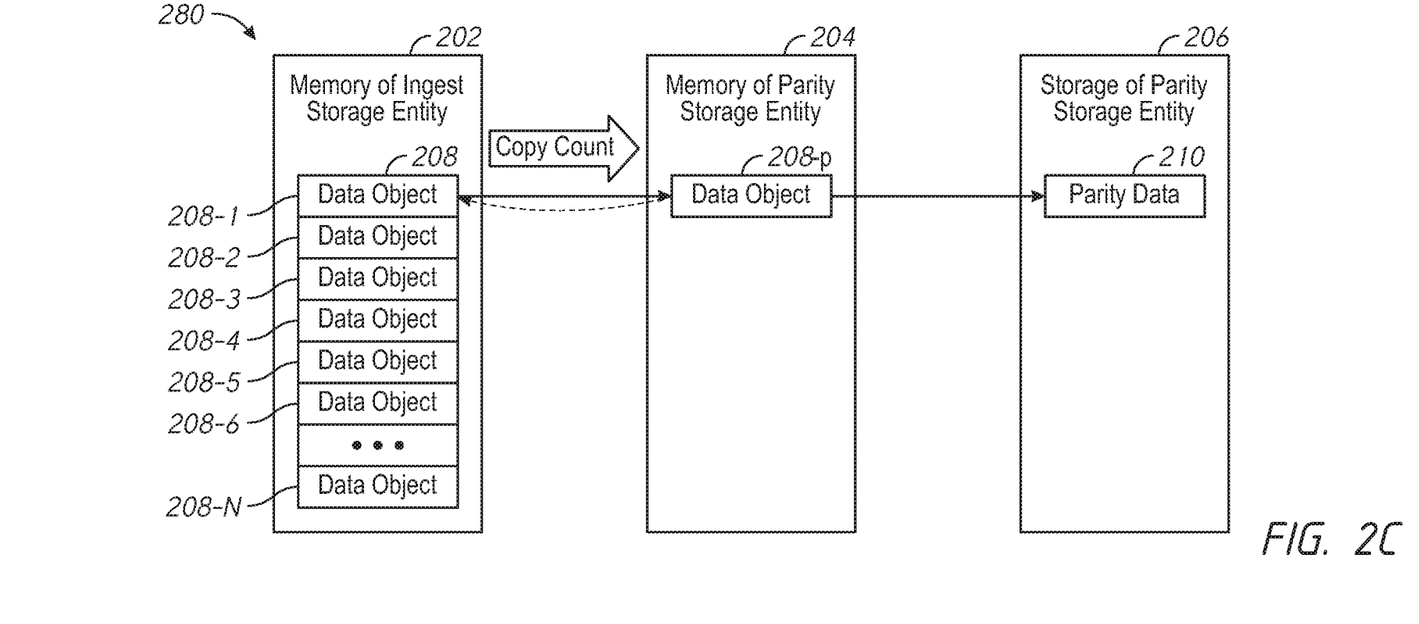
FIG. 2C is a block diagram representation of a storage environment demonstrating a third approach to storing parity data corresponding to multiple data objects in accordance with some implementations.

FIG. 2C is a block diagram of a storage environment 280 demonstrating a third approach to storing parity data corresponding to multiple data objects 208-1, 208-2, 208-3, 208-4, 208-5 . . . 208-N, in accordance with some implementations. In some implementations, this approach is used when the parity compression indicator stored in the compression setting 163 (FIG. 1B) is turned on. As such, compressed parity objects are generated and stored for duplicate data objects in order to save space and bandwidth for data object storage. The storage environment 280 shown in FIG. 2C is an improvement over the storage environment 200 shown in FIG. 2A. Elements common to FIGS. 2A and 2C include common reference numbers, and the differences between FIGS. 2A and 2C are described herein for the sake of brevity.

To that end, the storage environment 280 includes memory of ingest storage entity 202, memory of parity storage entity 204, and storage of parity storage entity 206. In some implementations, the ingest storage entity detects that a number of data objects stored at the data-storing storage entity have matching values, e.g., the data objects 208-1, 208-2, 208-3, 208-4, 208-5 . . . 208-N. In response to detecting duplication of the data objects 208, the ingest storage entity generates a copy count and communicates the copy count to the parity-storing storage entity. Upon receiving the communication from the ingest storage entity, the parity-storing storage entity does not create additional copies of data object 208 in the memory 204 of the parity storage entity. Instead, as shown in FIG. 2C, the parity-storing storage entity generates parity value 210 from one copy of data object 208-*p* and stores the parity data object 210 into the persistent storage 206.

FIG. 2C shows that the use case of common storage of parity data for unique copy recording is not limited to batch requests as shown in FIGS. 1B and 2B. In case duplicate data exist in the data requested for storage, the duplication of data objects can be recognized and the savings would be realized by reducing the amount of parity data generated and stored. Thus, relative to the first approach described above with reference to FIG. 2A, the third approach as shown in FIG. 2C saves the storage space for storing the parity object and saves the communication bandwidth. For example, if 1000 matching data objects 208 and parity data are requested to be stored in the storage environment 280, the communication path between the ingest storage entity and one or more storage entities transports one copy of object, one write instruction, and possibly one acknowledgment message. Thus, relative to the first approach shown in FIG. 2A, the third approach as shown in FIG. 2C reduces the disk overhead for writing parity object 210, so that space can be saved for storing the data objects 208.

Figure 3:
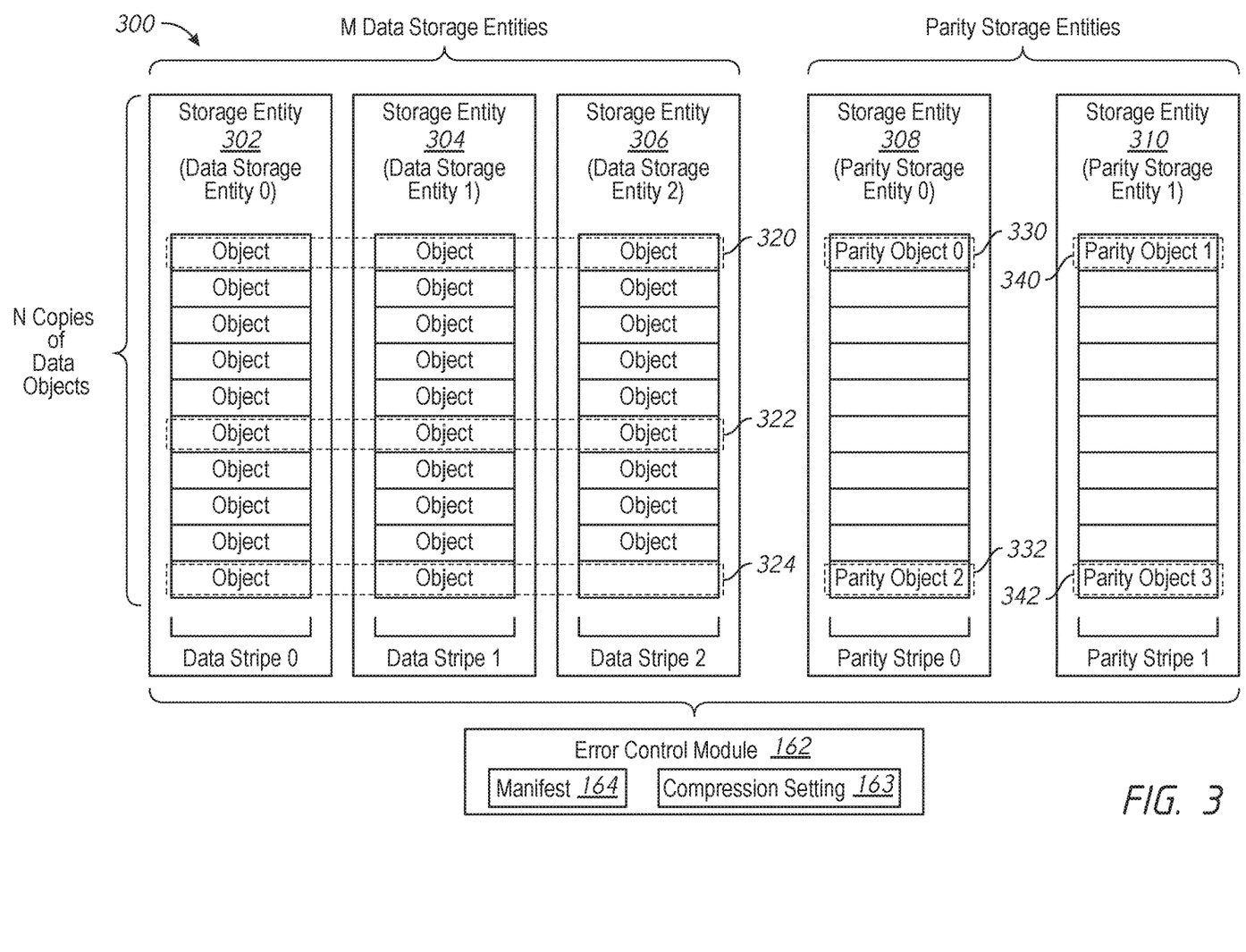
FIG. 3 is a block diagram representation of a storage environment with three data-storing storage entities and two parity-storing storage entities, demonstrating compressed parity data storage in accordance with some implementations.

FIG. 3 is a block diagram of a storage environment 300 with three data-storing storage entities 302, 304, and 306, and two parity-storing storage entities 308 and 310 (e.g., a DEC pattern of 3:2), demonstrating compressed parity data storage in accordance with some implementations. FIG. 3 illustrates the outcome of applying the compression techniques described above with reference to FIGS. 2B and 2C. In particular, as shown in FIG. 3, the number of parity objects stored at parity storage entity 0 308 and parity storage entity 1 310 has decreased relative to using the first approach shown in FIG. 2A.

To that end, in some implementations, the error control module 162 receives a request to store N copies of the data object at M data storage entities. In the request, N is the copy count as derived from a batch request (e.g., the batch request 102a as shown in FIG. 1B) or from recognizing repeat patterns in the data objects (FIG. 2C). The storage system also includes X parity storage entities for storing parity objects, where the X parity storage entities are different from the M data storage entities, e.g., M data servers (or M data stripes) and X parity servers (or X parity stripes). In the example of storage environment 300, the request specifies storing 29 copies of the data object across three data stripes and storing parity objects across two parity stripes, e.g., N=29, M=3, and X=2, and DEC pattern of 3:2.

In response to receiving the request, the error control module 162 generates the parity object 0 330 for a data object set 320, which contains three copies of the data object distributed across the three data storage entities 302, 304, and 306. Additionally, the error control module 162 determines whether the copy count 29 is divisible by the number of data storage entities 302, 304, and 306. Since 29 is not divisible by 3 data stripe count (e.g., data stripe 0 302, data stripe 1 304, and data stripe 2 306), the error control module 162 generates and retains parity object 2 332 for the last data object set 324. Further, according to the DEC pattern of 3:2, the error control module 162 generates the parity object 1 340 that corresponds to the first data object set 320 and generates the parity object 3 342 that corresponds to the last data object set 324.

As shown in FIG. 3, the error control module 162 generates the parity object 0 330 and parity object 1 340 for the data object set 320 containing the first three data objects. In contrast, FIG. 3 does not show parity object(s) for the $4^{th}$ to $27^{th}$ data objects. While the repeated storage of the same data object in unique content is necessary to comply with the legal requirements (e.g., DMCA) of storing unique copies for each user, the parity stripes 308 and 310 in and of themselves do not constitute copyrightable objects, as they do not contain data that is in and of itself copyrightable content. As such, a primary point of optimization in accordance with some implementations described herein is to construct the parity data such that a single content's parity data (e.g., the parity object(s) 330 and/or 340) can be used for identical content instances, rather than being repeated for each identical content instance.

In the event of disk or hardware failure, the missing data object(s) can be recovered using the common parity, e.g., the parity object 0 330 and/or the parity object 1 340. In some implementations, in order to establish the association of other copies of the data objects to the parity object 0 330 and parity object 1 340, the error control module 162 generates the manifest data 164. For example, in FIG. 3, records in the manifest 164 link the parity object 0 330 and the parity object 1 340 with another set of three data objects, e.g., the set of data objects 322. As such, the error control module 162 compresses the repeating pattern in the parity data and represents it as a single instance of parity, e.g., the parity object 0 330 and/or the parity object 1 340. In some implementations, a repeat count is stored with the parity object(s) 330 and/or 340 in order to establish the association of the parity object(s) with the data objects.

It should be noted that though FIG. 3 illustrates an example of distributing 29 data objects sequentially and evenly across three data storage entities and generating the parity objects 330, 332, 340, and 342 for the 29 data objects, one of ordinary skill in the art will appreciate that the parity compression techniques described herein can be used for any number of data objects and/or storage entities and a variety of data object storage arrangements, e.g., nonsequential storage of data objects.

Figure 4:
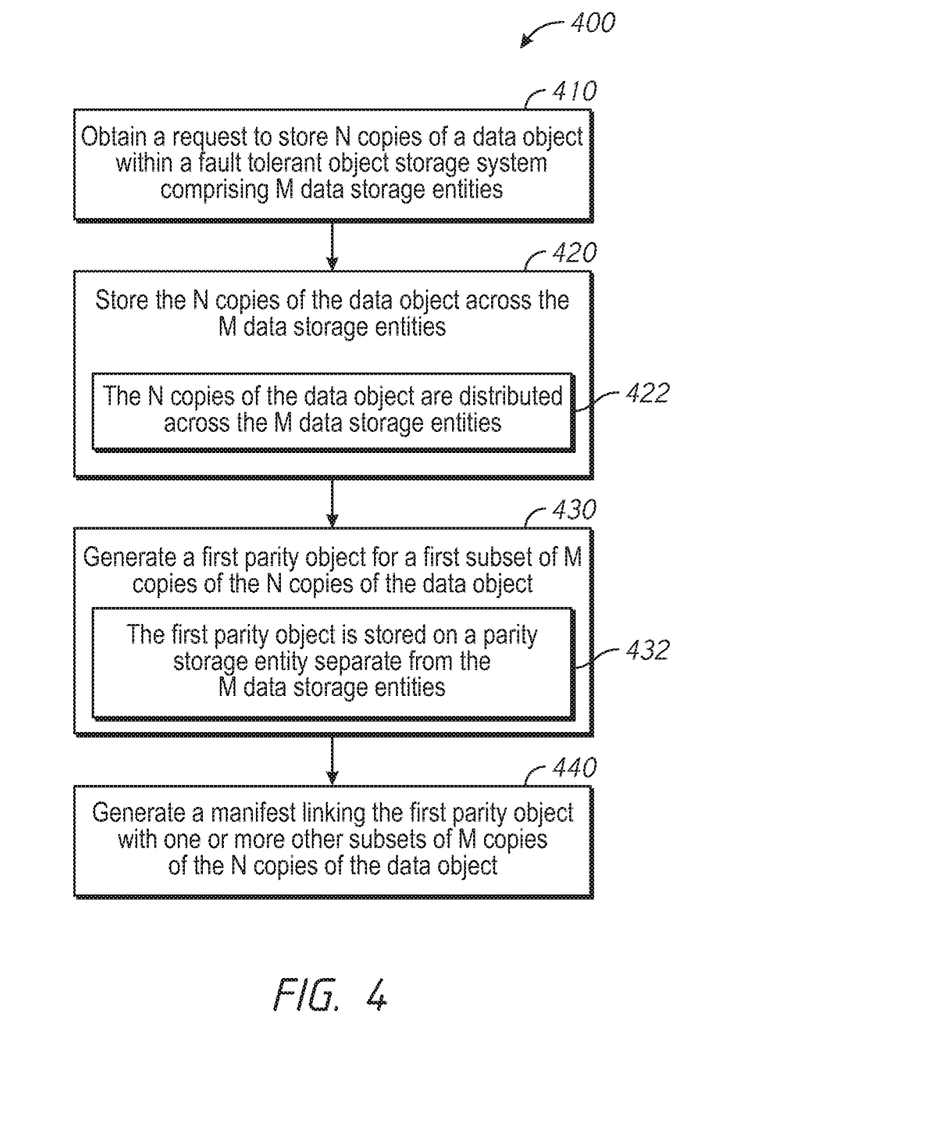
FIG. 4 is a flowchart representation of a method of writing compressed parity data in accordance with some implementations.

FIG. 4 is a flowchart representation of a method 400 of writing compressed parity data in accordance with some implementations. In some implementations and as detailed below as an example, the method 400 is performed at a fault-tolerant object storage system, such as the object-based storage system 104 in FIG. 1B, or a component of the storage system 104, such as the storage entity 108c in FIG. 1B. In some implementations, the fault-tolerant object storage system includes M data storage entities (e.g., a cluster of servers), where each of the M data storage entities is configured to store raw media data on an object-basis (e.g., a video, an episode of TV show, or 10 MB of multimedia data). In some implementations, the fault-tolerant object storage system also includes a number of parity storage entities for storing parity objects (e.g., the parity storage entities 308 and 310 for storing the parity objects 330, 332, 340, and 342, as shown in FIG. 3). In some implementations, these parity storage entities are different from the M data storage entities for storing data objects, e.g., the parity stripes 308 and 310 are different servers from the data stripes 302, 304, and 306 as shown in FIG. 3.

In some implementations, the method 400 is performed by processing logic, including hardware, firmware, software, or a combination thereof. In some implementations, the method 400 is performed by a processor, a controller, and/or a circuitry executing code stored in a non-transitory computer-readable medium (e.g., a memory). In some implementations, the method 400 is performed by an error control module, such as the error control module 162 in FIG. 1B. Briefly, the method 400 includes obtaining a request to storing duplicate copies of a data object and generating compressed parity object(s) in response to receiving the request.

To that end, as represented by block 410, the method 400 includes obtaining a request to store N copies of a data object within the fault-tolerant object storage system. As explained above with reference to FIGS. 1B and 2B, in some implementations, one or more client requests are aggregated or packaged into a batch request. In some implementations, the request is generated in response to detecting duplication of the data object, as shown in FIG. 2C.

As represented by block 420, the method 400 also includes storing the N copies of the data object across the M data storage entities in response to the request. In some implementations, as represented by block 422, the N copies of the data object are distributed across the M data storage entities such that any two sequential copies of the N copies are stored on two separate storage entities of the M data storage entities. In other words, each instance of the data object is stored on one server, e.g., a first instance of the data object is stored on server 302, a second instance is stored on server 304, and a third instance is stored on server 306, as shown in FIG. 3.

As represented by block 430, the method 400 includes generating a first parity object for a first subset of M copies of the N copies of the data object. In some implementations, as represented by block 432, the first parity object is stored on a first parity storage entity separate from the M data storage entities. For example, in a DEC pattern of 3:2 as shown in FIG. 3, the first parity object 0 330 is generated for the data object set 320 comprising the first three data objects, and the first parity object 0 330 is stored on the parity stripe 308 separate from the three data stripes 302, 304, and 306.

Still referring to FIG. 4, as represented by block 440, the method 400 includes generating a manifest linking the first parity object with one or more other subsets of M copies of the N copies of the data object. In other words, the manifest establishes the association of other copies of the data object to the parity object generated above. For example, as shown in FIG. 3, in DEC pattern of 3:2, after generating the first parity object 0 330 for the first three data objects, the manifest 164 links the first parity object 0 330 with another three data objects. In some implementations, a repeat count is stored with the parity object in order to establish the association of the parity object with other duplicate copies of the data object.

Writing compressed parity data in accordance with various implementations of method 400 changes how the parity is generated. Instead of generating parity for copies of the data object, the file system generates parity for a single copy of stored data object. In the event of disk or hardware failure, the data object can be recovered using the common parity. For example, in a conventional system with a DEC striping pattern of 16:2, the parity storage overhead would be 2/16, corresponding to 12.5%. In such conventional system, the parity storage overhead for a 10 MB video object that has 2000 copies stored in the file system using 16:2 distributed erasure coding would be (10 MB*2000)*12.5%=2500 MB. Using the parity compression method 400 described herein, because the copy count 2000 is divisible by the number of data stripes 16, two parity objects would be generated. Thus, the parity overhead would be 2*10 MB=20 MB. Thus, the larger the copy count, the more significant the parity overhead savings would be realized in accordance with implementations described herein. By reducing the amount of parity data required for fault tolerance, the system in accordance with various implementations described herein increases the amount of multimedia data that can be stored in the file system and reduces the disk overhead for writing data. As such, more concurrent video objects can be stored at the same time on less amount of hardware.

Figure 5:
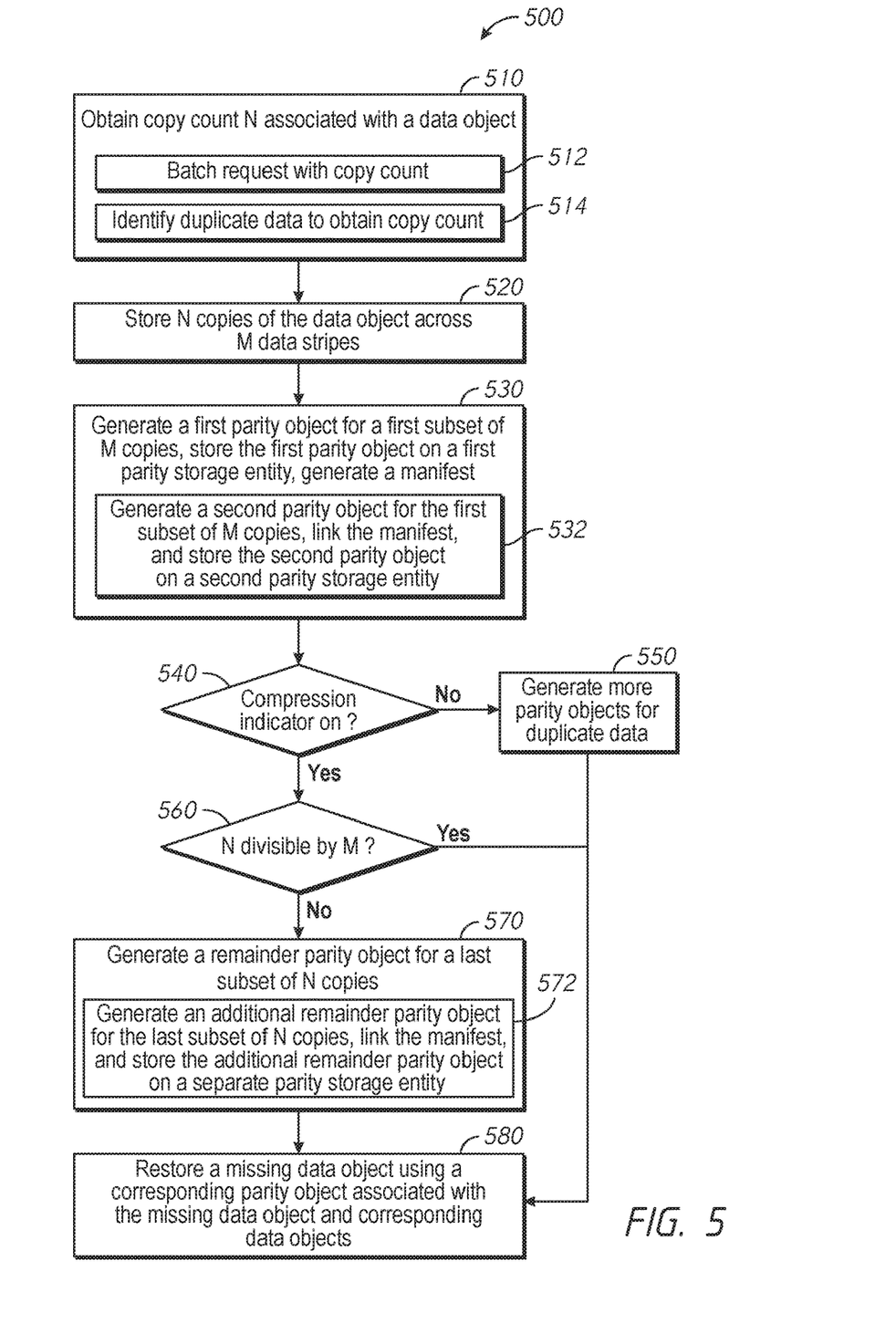
FIG. 5 is a flowchart representation of a method of generating compressed parity data and using the compressed parity data for recovery in accordance with some implementations.

FIG. 5 is a flowchart representation of a method 500 of writing parity data in accordance with some implementations. In some implementations and as detailed below as an example, the method 500 is performed at a fault-tolerant object storage system, such as the object-based storage system 104 in FIG. 1B, or a component of the storage system 104, such as the storage entity 108c in FIG. 1B. In some implementations, the fault-tolerant object storage system includes M data storage entities (e.g., a cluster of servers), where each of the M data storage entities is configured to store raw media data on an object-basis (e.g., a video, an episode of TV show, or 10 MB of multimedia data). In some implementations, the fault-tolerant object storage system also includes a number of parity storage entities for storing parity objects (e.g., the parity storage entities 308 and 310 for storing the parity objects 330, 332, 340, and 342, as shown in FIG. 3). In some implementations, these parity storage entities are different from the M data storage entities for storing data objects, e.g., the parity stripes 308 and 310 are different servers from the data stripes 302, 304, and 306 as shown in FIG. 3.

In some implementations, the method 500 is performed by processing logic, including hardware, firmware, software, or a combination thereof. In some implementations, the method 400 is performed by a processor, a controller, and/or a circuitry executing code stored in a non-transitory computer-readable medium (e.g., a memory). In some implementations, the method 500 is performed by an error control module, such as the error control module 162 in FIG. 1B. Briefly, the method 500 includes obtaining a copy count value N associated with a request to storing N copies of a data object, generating parity object(s) in response to receiving the request, where duplicate parity objects are generated when a compression indicator is off and compressed parity data is generated when the compression indicator is on, and restoring missing data utilizing the parity data.

To that end, as represented by block 510, the method 500 includes obtaining a copy count value N associated with a request to store N copies of a data object within the fault-tolerant object storage system. As represented by block 512 and as explained above with reference to FIGS. 1B and 2B, in some implementations, the copy count is specified in a batch request. The use case is not limited to batch request. As explained above with reference to FIG. 2C, in case duplicate data exists in the data for storage, the copy count is obtained by identifying the number of duplicates in the data, as represented by block 514. The savings thus can be realized by reducing the amount of parity data generated and stored. In such implementations, the copy count is obtained by receiving multiple requests (e.g., client requests) to store data within the fault-tolerant object storage system, identifying the N copies of the data object in the data (i.e., duplicates or identical data) associated with the multiple requests, and generating the request to store the N copies of the data object within the fault-tolerant object storage system.

In some implementations, as represented by block 520, the method 500 includes storing N copies of the data object across the M data storage entities in response to the request. As represented by block 530, the method 500 includes generating a first parity object for a first subset of M copies of the N copies of the data object and generating a manifest linking the first parity object with one or more other subsets of M copies of the N copies of the data object. In some implementations, the N copies of the data object are evenly and/or sequentially distributed across the M data storage entities, and the first parity object is generated based on the M copies of the data object in the first subset. For example, in FIG. 3, the 29 instances of the data object are evenly and sequentially distributed across 3 data stripes on 3 servers, e.g., N=29 and M=3. The first subset 320 contains three instances of the data object, and these three instances are stored on three different servers 302, 304, and 306. The parity object 0 330 is calculated based on the subset 320.

In some implementations, as represented by block 532, the method 500 further includes (a) generating a second parity object for the first subset of M copies of the N copies of the data object, where the second parity object is different from the first parity object; (b) linking, within the manifest, the second parity object with one or more other subsets of M copies of the N copies of the data object, and (c) storing the second parity object on a second parity storage entity separate from the first parity storage entity. For example, in FIG. 3, there are two parity stripes 308 and 310. The first parity object 0 330 is generated for the set 320 corresponding to the first three data objects. The second parity object 1 340 is also generated for the set 320 corresponding to the first three data objects. The second parity object 1 340 is stored on the parity stripe 310 separate from the parity stripe 308, where the first parity object 0 330 is stored.

Still referring to FIG. 5, in some implementations, as represented by block 540, the method 500 includes determining whether or not a compression indicator is on, e.g., the error control module 162 determines whether the compression setting 163 is configured by the user to turn on the compression. In some implementations, based on a determination that the compression indicator indicates that the parity compression is off ("No" path from block 540), the method 500 includes generating more parity objects for duplicate data, as described above with reference to FIG.

2A. On the other hand, with reference to block 560, in accordance with a determination that the compression indicator indicates that the parity compression is on ("Yes" path from block 540), the method 500 includes determining whether N is divisible by M, as represented by block 560. In case N is not divisible by M, as represented by block 570, the method 500 includes determining a remainder number of the N copies of the data object, where the remainder number of copies is less than M, and generating a remainder parity object for a last subset of N copies of the data object, e.g., generating the remainder parity object for the remainder number of the N copies of the data object. For example, in FIG. 3, since the copy count 29 is not divisible by the data stripe count 3, the last parity object 2 332 will be different from the first parity object 0 330 and thus is retained.

In some implementations, as represented by block 572 and similar to the step represented by block 532, once the remainder parity object is generated, the method 500 further includes (a) generating an additional remainder parity object for the last subset of N copies of the data object, where the additional remainder parity object is different from the remainder parity object; (b) linking, within the manifest, the additional remainder parity object with the remainder number of the N copies of the data object, and (c) storing the additional remainder parity object on a second parity storage entity that is separate from the first parity storage entity. For example, in FIG. 3, there are two parity stripes 308 and 310. The remainder parity object 2 332 is generated for the last subset set 324, which corresponds to the last two remainder data objects. The additional remainder parity object 3 344 is also generated for the remainder set 324 corresponding to the last two remainder data objects. The additional remainder parity object 3 342 is stored on the parity stripe 310 that is separate from the parity stripe 308, where the remainder parity object 2 332 is stored.

In some implementations, as represented by block 580, the method 500 includes restoring a missing data object using a corresponding parity object associated with the missing data object and corresponding data objects stored in the fault-tolerant object storage system. In other words, to recover a missing data object in a data stripe, the corresponding data objects in the other data stripes and parity stripe(s) (at the same offset and for the same length) are read and combined using the DEC algorithm to recreate the original data object. Because each of the stripes (data and parity) resides on a different server, a server may be lost and all its data can still be recovered. For example, in FIG. 3, if the data object in the subset 322 residing on the storage entity 302 (e.g., the data storage entity 0 302) is lost, the common parity object 0 330 and the corresponding data object in the first subset 320 (e.g., the data object residing on the storage entity 302 in the first subset 320) can be used to derive the values of the lost data object.

In some implementations, during the recovery process, the common parity object is located through the manifest 164, as shown in FIG. 3. In some implementations, the common parity object includes a repeat indicator (e.g., a repeat count). As such, the common parity object is represented as a parity object with a corresponding repeat count. During the recovery process, the common parity object for the missing data object(s) can be located by evaluating the repeat count associated with the parity object.

Figure 6:
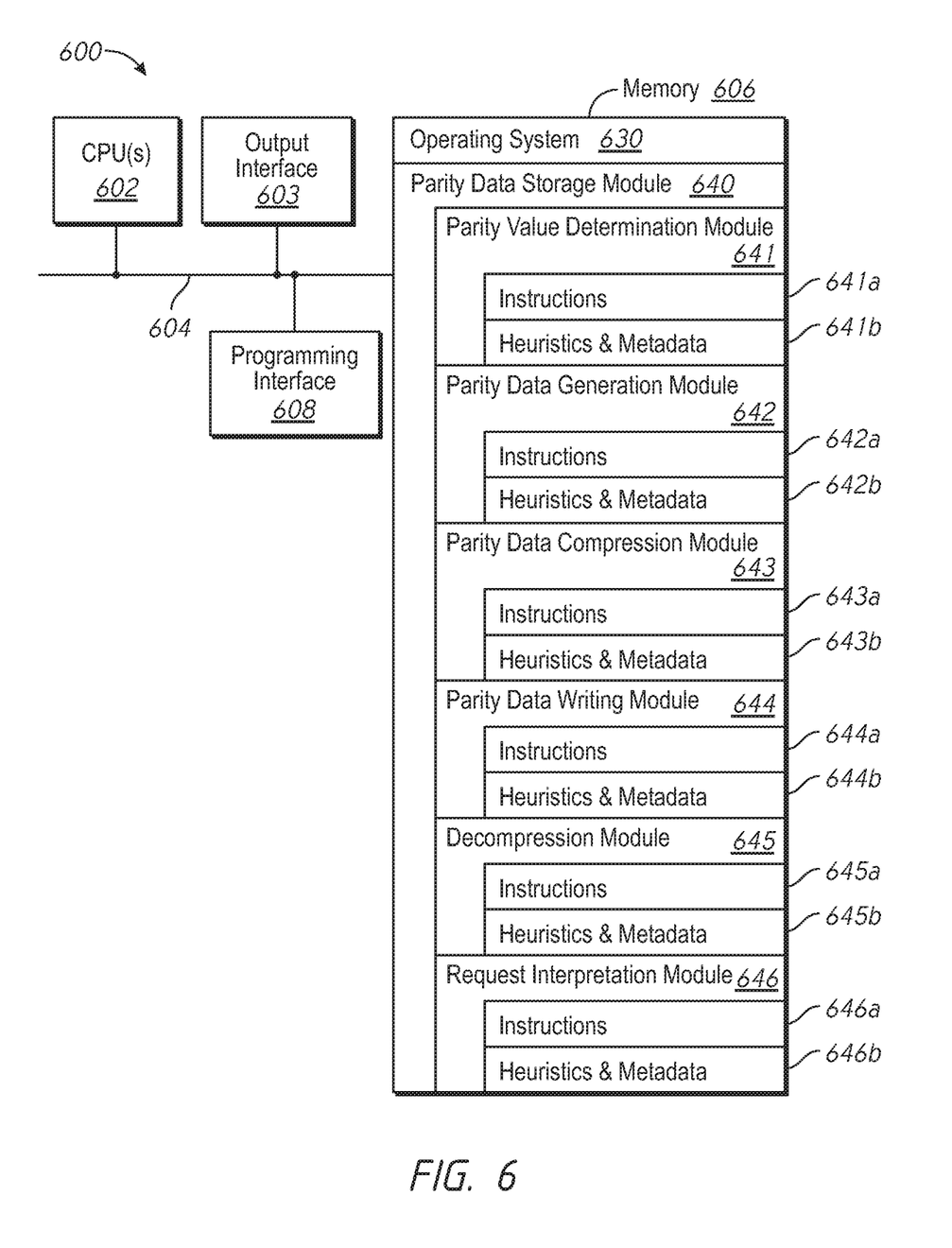
FIG. 6 is a block diagram of a computing device of an object-based storage system in accordance with some implementations.

FIG. 6 is a block diagram of a computing device 600 in accordance with some implementations. In some implementations, the computing device 600 corresponds to a storage entity such as storage entity 108c of FIG. 1B and performs one or more of the functionalities described above with respect to a storage entity. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some implementations the computing device 600 includes one or more processing units (CPU's) 602 (e.g., processors), one or more output interfaces 603 (e.g., a network interface), a memory 606, a programming interface 608, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and a parity data storage module 640. In some implementations, one or more instructions are included in a combination of logic and non-transitory memory. The operating system 630 includes procedures for handling various basic system services and for performing hardware dependent tasks. In some implementations, the parity data storage module 640 is configured to create parity objects and compress parity information corresponding to a data object. To that end, the parity data storage module 640 includes a parity value determination module 641, a parity data generation module 642, a parity data compression module 643, a parity data writing module 644, a decompression module 645 and a request interpretation module 646.

In some implementations, the parity value determination module 641 is configured to calculate a parity value corresponding to a data object set. To that end, the parity value determination module 641 includes a set of instructions 641a and heuristics and metadata 641b. In some implementations, the parity data generation module 642 is configured to generate one or more parity objects associated with a data object, and corresponding to one or more data object sets corresponding to the data object. To that end, the parity data generation module 642 includes a set of instructions 642a and heuristics and metadata 642b. In some implementations, the parity data compression module 643 is configured to compress one or more generated or determined parity objects, including in some implementations, generating a manifest linking the parity object with one or more other subsets of the data object. In some implementations, the parity data compression module 643 stores a repeat count with the parity object in order to establish the association of the parity object with other duplicate copies of the data object. To that end, the parity data compression module 643 includes a set of instructions 643a and heuristics and metadata 643b.

In some implementations, the parity data writing module 644 is configured to write one or more parity objects, including compressed parity data, repeat count, and/or manifest links. To that end, the parity data writing module 644 includes a set of instructions 644a and heuristics and metadata 644b. In some implementations, the decompression module 645 is configured to decompress compressed parity data. To that end, the decompression module 645 includes a set of instructions 645a and heuristics and metadata 645b. In some implementations, the request interpretation module 646 is configured to read and extract information from a write request (e.g., received from an ingest storage entity). To that end, the request interpretation module 646 includes a set of instructions 646a and heuristics and metadata 646b.

Although the parity value determination module 641, parity data generation module 642, parity data compression module 643, parity data writing module 644, decompression module 645 and request interpretation module 646 are illustrated as residing on a single computing device 600, it should be understood that in other embodiments, any combination of the parity value determination module 641, parity data generation module 642, parity data compression module 643, parity data writing module 644, decompression module 645 and request interpretation module 646 can reside in separate computing devices in various implementations. For example, in some implementations each of the parity value determination module 641, parity data generation module 642, parity data compression module 643, parity data writing module 644, decompression module 645 and request interpretation module 646 resides on a separate computing device.

Moreover, FIG. 6 is intended more as a functional description of the various features that are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A method comprising:

at a fault-tolerant object storage system including M data storage entities, each configured to store data on an object-basis, and one or more controllers:

obtaining a request to store N copies of a data object within the fault-tolerant object storage system;

storing the N copies of the data object across the M data storage entities in response to the request, wherein the N copies of the data object are distributed across the M data storage entities such that any two sequential copies of the N copies are stored on two separate storage entities of the M data storage entities;

generating a first parity object for a first subset of M copies of the N copies of the data object, wherein the first parity object is stored on a first parity storage entity separate from the M data storage entities;

generating a manifest linking the first parity object with one or more other subsets of M copies of the N copies of the data object;

obtaining a parity compression indicator, wherein the parity compression indicator is user configurable; and generating and storing a second parity object for a second subset of M copies of the N copies of the data object when the parity compression indicator is set to off, wherein the second parity object has a same value as the first parity object.

2. The method of claim 1, further comprising:

determining a remainder number of the N copies of the data object, wherein the remainder number is less than M; and generating a remainder parity object for the remainder number of the N copies of the data object.

3. The method of claim 1, further comprising:
generating a third parity object for the first subset of M copies of the N copies of the data object, wherein the third parity object is different from the first parity object;
linking, within the manifest, the third parity object with the one or more other subsets of M copies of the N copies of the data object; and
storing the third parity object on a second parity storage entity separate from the first parity storage entity.

4. The method of claim 1, wherein the data object represents a portion of raw media data.

5. The method of claim 1, wherein:
the N copies of the data object are evenly distributed across the M data storage entities; and
the first parity object is generated based on the M copies of the data object in the first subset.

6. The method of claim 1, wherein the first parity object includes a repeat indicator.

7. The method of claim 1 further comprising restoring a missing data object using a corresponding parity object associated with the missing data object and corresponding data objects stored in the fault-tolerant object storage system.

8. The method of claim 1, wherein obtaining the request to store the N copies of the data object within the fault-tolerant object storage system includes:
receiving multiple requests to store data within the fault-tolerant object storage system;
identifying the N copies of the data object in the data associated with the multiple requests; and
generating the request to store the N copies of the data object within the fault-tolerant object storage system.

9. A fault-tolerant object-based storage system comprising:
M data storage entities, each configured to store data on an object-basis;
a controller with control links to each of the plurality of M data storage entities, wherein the controller is configured to:
obtain a request to store N copies of a data object within the fault-tolerant object storage system;
store the N copies of the data object across the M data storage entities in response to the request, wherein the N copies of the data object are distributed across the M data storage entities such that any two sequential copies of the N copies are stored on two separate storage entities of the M data storage entities;
generate a first parity object for a first subset of M copies of the N copies of the data object, wherein the first parity object is stored on a first parity storage entity separate from the M data storage entities;
generate a manifest linking the first parity object with one or more other subsets of M copies of the N copies of the data object;
obtain a parity compression indicator, wherein the parity compression indicator is user configurable; and
generate and store a second parity object for a second subset of M copies of the N copies of the data object when the parity compression indicator is set to off, wherein the second parity object has a same value as the first parity object.

10. The fault-tolerant object-based storage system of claim 9, wherein the controller is further configured to:
determine a remainder number of the N copies of the data object, wherein the remainder number of copies is less than M; and
generate a remainder parity object for the remainder number of the N copies of the data object.

11. The fault-tolerant object-based storage system of claim 9, wherein the controller is further configured to:
generate a third parity object for the first subset of M copies of the N copies of the data object, wherein the third parity object is different from the first parity object;
link, within the manifest, the third parity object with one or more other subsets of M copies of the N copies of the data object; and
store the third parity object on a second parity storage entity separate from the first parity storage entity.

12. The fault-tolerant object-based storage system of claim 9, wherein the controller is further configured to restore a missing data object using a corresponding parity object associated with the missing data object and corresponding data objects stored in the fault-tolerant object storage system.

13. The fault-tolerant object-based storage system of claim 9, wherein obtaining the request to store the N copies of the data object within the fault-tolerant object storage system includes:
receiving multiple requests to store data within the fault-tolerant object storage system;
identifying the N copies of the data object in the data associated with the multiple requests; and
generating the request to store the N copies of the data object within the fault-tolerant object storage system.

14. A fault-tolerant object-based storage device configured to protect stored data from loss at M data storage entities, each configured to store data on an object-basis, comprising:
one or more controllers;
a non-transitory memory;
one or more control links to the M data storage entities;
means for obtaining a request to store N copies of a data object within the fault-tolerant object storage system;
means for storing the N copies of the data object across the M data storage entities in response to the request, wherein the N copies of the data object are distributed across the M data storage entities such that any two sequential copies of the N copies are stored on two separate storage entities of the M data storage entities;
means for generating a first parity object for a first subset of M copies of the N copies of the data object, wherein the first parity object is stored on a first parity storage entity separate from the M data storage entities;
means for generating a manifest linking the first parity object with one or more other subsets of M copies of the N copies of the data object
means for obtaining a parity compression indicator, wherein the parity compression indicator is user configurable; and
means for generating and storing a second parity object for a second subset of M copies of the N copies of the data object when the parity compression indicator is set to off, wherein the second parity object has a same value as the first parity object.

15. The fault-tolerant object-based storage device of claim 14, wherein the means for obtaining the request to store the N copies of the data object within the fault-tolerant object storage system include:

means for receiving multiple requests to store data within the fault-tolerant object storage system;
means for identifying the N copies of the data object in the data associated with the multiple requests; and
means for generating the request to store the N copies of the data object within the fault-tolerant object storage system.

16. The fault-tolerant object-based storage device of claim 14, further comprising means for restoring a missing data object using a corresponding parity object associated with the missing data object and corresponding data objects stored in the fault-tolerant object storage system.

* * * * *